US011686633B1

(12) United States Patent
Torres et al.

(10) Patent No.: US 11,686,633 B1
(45) Date of Patent: Jun. 27, 2023

(54) METHODS FOR STRAIN GAUGE TEMPERATURE CORRECTION

(71) Applicant: Lockheed Martin Corporation, Bethesda, MD (US)

(72) Inventors: Manuel Torres, Malvern, PA (US); Garrett Michael Strickland, Exton, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 214 days.

(21) Appl. No.: 17/169,311

(22) Filed: Feb. 5, 2021

(51) Int. Cl.
*B64F 5/60* (2017.01)
*G01L 1/22* (2006.01)
*B64C 9/00* (2006.01)

(52) U.S. Cl.
CPC .............. *G01L 1/2281* (2013.01); *B64C 9/00* (2013.01); *B64F 5/60* (2017.01)

(58) Field of Classification Search
CPC ............. B64F 5/60; B64C 9/00; G01L 1/2281
See application file for complete search history.

(56) References Cited

U.S. PATENT DOCUMENTS

2017/0137116 A1\* 5/2017 Ireland .................... B64C 23/06

OTHER PUBLICATIONS

"Aerodynamic Force and Moment Wind Tunnel Tests in AEDS VKF Tunnels B and C Mach 6, 8 and 10", Science Applications International Corporation, Feb. 1997, pp. 530-537.

\* cited by examiner

*Primary Examiner* — Jamel E Williams
(74) *Attorney, Agent, or Firm* — Bakerhostetler

(57) ABSTRACT

A method includes identifying a plurality of measured strain gauge values of interest from a plurality of measured strain gauge values. The plurality of measured strain gauge values of interest corresponds to a plurality of temperature values of interest. The method further includes comparing the plurality of measured strain gauge values of interest to a plurality of expected strain gauge values of interest to determine a plurality of strain gauge correction values. The plurality of strain gauge correction values corresponds to the plurality of temperature values of interest. The method further includes correlating the plurality of strain gauge correction values to the plurality of temperature values of interest to determine a correction value-temperature relationship. The method also includes determining a corrected real-time strain gauge value by applying the correction value-temperature relationship to a real-time strain gauge value and a corresponding real-time temperature.

20 Claims, 4 Drawing Sheets

METHODS FOR STRAIN GAUGE TEMPERATURE CORRECTION

STATEMENT REGARDING FEDERALLY SPONSORED RESEARCH OR DEVELOPMENT

Not applicable.

BACKGROUND

Field

The present description relates in general to strain gauges, and more particularly to, for example, without limitation, methods to correct data from strain gauges.

Description of the Related Art

The description provided in the background section should not be assumed to be prior art merely because it is mentioned in or associated with the background section. The background section may include information that describes one or more aspects of the subject technology.

During the development of aircraft, designs can be tested and validated. Validation of in-flight performance of certain flight components and structures (e.g. nosetip, forebody sections, control surfaces, etc.) on development and/or demonstration test vehicles can be used for post-flight reconstruction, analysis and assessment prior to decisions regarding low-rate initial production (LRIP) and full-rate production (FRP). Testing or validation can be performed in wind tunnels and/or during test flights.

Strain gauges can be used to measure the in-flight performance of flight components and/or structures. In some applications, high temperatures, such as those experienced during hypersonic flight, can affect the values reported by the strain gauge.

It would be advantageous to provide a method to correct data received from strain gauges during high temperature operation to allow real time review and analysis of in-flight performance of flight components and/or structures, including during hypersonic flight.

SUMMARY

The subject technology is illustrated, for example, according to various aspects described below.

According to some embodiments, a method includes collecting a plurality of measured strain gauge values from a strain gauge; collecting a plurality of temperature values wherein each temperature value of the plurality of temperature values corresponds to a respective measured strain gauge value of the plurality of measured strain gauge values; identifying a plurality of measured strain gauge values of interest from the plurality of measured strain gauge values, wherein the plurality of measured strain gauge values of interest corresponds to a plurality of temperature values of interest; comparing the plurality of measured strain gauge values of interest to a plurality of expected strain gauge values of interest to determine a plurality of strain gauge correction values, wherein the plurality of strain gauge correction values corresponds to the plurality of temperature values of interest; correlating the plurality of strain gauge correction values to the plurality of temperature values of interest to determine a correction value—temperature relationship; and determining a corrected real-time strain gauge value by applying the correction value-temperature relationship to a real-time strain gauge value and a corresponding real-time temperature.

In some embodiments, the method further includes collecting a plurality of angle of attack values wherein each angle of attack value of the plurality of angle of attack values corresponds to a respective measured strain gauge value of the plurality of measured strain gauge values. Further, the method can include identifying a plurality of angle of attack values of interest from the plurality of angle of attack values; and identifying the plurality of measured strain gauge values of interest corresponding to the plurality of angle of attack values of interest. In some embodiments, each of the plurality of expected strain gauge values of interest is about zero (e.g. a zero-load or no-load condition).

Optionally, the method can include repeating comparing the plurality of measured strain gauge values of interest to the plurality of expected strain gauge values of interest to determine the plurality of strain gauge correction values after determining the correction value—temperature relationship.

In some embodiments, the plurality of measured strain gauge values comprises a plurality of voltage values.

In some embodiments, the method can include time-aligning the plurality of measured strain gauge values with the plurality of temperature values.

According to some embodiments an aircraft includes a control surface; a strain gauge coupled to the control surface; a temperature sensor; and a controller operatively coupled to the strain gauge and the temperature sensor, the controller configured to: collect a plurality of measured strain gauge values from the strain gauge; collect a plurality of temperature values from the temperature sensor, wherein each temperature value of the plurality of temperature values corresponds to a respective measured strain gauge value of the plurality of measured strain gauge values; identify a plurality of measured strain gauge values of interest from the plurality of measured strain gauge values, wherein the plurality of measured strain gauge values of interest corresponds to a plurality of temperature values of interest; compare the plurality of measured strain gauge values of interest to a plurality of expected control surface strain values of interest to determine a plurality of strain gauge correction values, wherein the plurality of strain gauge correction values corresponds to the plurality of temperature values of interest; correlate the plurality of strain gauge correction values to the plurality of temperature values of interest to determine a correction value-temperature relationship; and determine a strain value associated with the control surface by applying the correction value-temperature relationship to a real-time strain gauge value and a corresponding real-time temperature.

Optionally, the control surface comprises an aileron, flap, elevon, speed brake, body flap, or other similar aerodynamic control effector.

In some embodiments, at least one temperature value of the plurality of temperature values is greater than 200 F.

In some embodiments, the controller is further configured to: collect a plurality of angle of attack values of the control surface wherein each angle of attack value of the plurality of angle of attack values corresponds to a respective measured strain gauge value of the plurality of measured strain gauge values. Optionally, the controller is further configured to: identify a plurality of angle of attack values of interest from the plurality of angle of attack values; and identify the plurality of measured strain gauge values of interest corresponding to the plurality of angle of attack values of interest.

Further, each of the plurality of expected control surface strain values of interest can be about zero.

In some embodiments, the controller is further configured to repeat comparing the plurality of measured strain gauge values of interest to the plurality of expected control surface strain values of interest to determine the plurality of strain gauge correction values after determining the correction value-temperature relationship.

In some embodiments, the plurality of measured strain gauge values comprises a plurality of voltage values. Optionally, the controller is further configured to: time-align the plurality of measured strain gauge values with the plurality of temperature values.

According to some embodiments a non-transitory computer-readable storage medium storing one or more programs, the one or more programs including instructions which, when executed by a system, cause the system to collect a plurality of measured strain gauge values from a strain gauge; collect a plurality of temperature values wherein each temperature value of the plurality of temperature values corresponds to a respective measured strain gauge value of the plurality of measured strain gauge values; identify a plurality of measured strain gauge values of interest from the plurality of measured strain gauge values, wherein the plurality of measured strain gauge values of interest corresponds to a plurality of temperature values of interest; compare the plurality of measured strain gauge values of interest to a plurality of expected strain gauge values of interest to determine a plurality of strain gauge correction values, wherein the plurality of strain gauge correction values corresponds to the plurality of temperature values of interest; correlate the plurality of strain gauge correction values to the plurality of temperature values of interest to determine a correction value-temperature relationship; and determine a corrected real-time strain gauge value by applying the correction value-temperature relationship to a real-time strain gauge value and a corresponding real-time temperature.

In some embodiments, the instructions further include collect a plurality of angle of attack values wherein each angle of attack value of the plurality of angle of attack values corresponds to a respective measured strain gauge value of the plurality of measured strain gauge values. The instructions can further include identify a plurality of angle of attack values of interest from the plurality of angle of attack values; and identify the plurality of measured strain gauge values of interest corresponding to the plurality of angle of attack values of interest. In some embodiments, each of the plurality of expected strain gauge values of interest is about zero.

In the following description, specific embodiments are described to shown by way of illustration how the invention may be practiced. It is to be understood that other embodiments may be utilized and changes may be made without departing from the scope of the present invention.

DETAILED DESCRIPTION

In some applications, certain conventional strain gauges may utilize "temperature-corrected" strain gauge bridge layouts. However, conventional "temperature-corrected" strain gauge bridge layouts may not effectively correct for high temperatures, such as temperatures experienced during hypersonic flights. Further, certain conventional strain gauges may utilize water cooling or other simple cooling methods to minimize temperature effects on strain gauge force measurement systems. However, the use of cooling devices may increase the size, weight, and/or complexity of the strain gauge assembly and may not be compatible with packaging limitations aboard a hypersonic flight vehicle or reentry vehicle.

In some applications, certain conventional methods or systems may analyze strain data in a post-test assessment to derive voltage signal drifts due to temperature changes. However, post-test analysis does not allow for real-time data or real-time adjustments of flight parameters.

Therefore, it is desirable to provide a method or system to correct strain gauge data for temperature variances in near real-time or real-time. Further, it is desirable to provide a method or system that can self-learn corrections to the strain-gauge data as correction factors or relationships change during operation.

As appreciated by the present disclosure, embodiments of the methods and/or systems described here allow for real-time correction of strain gauge measurement at high temperatures.

The present description relates in general to strain gauges, and more particularly to, for example, without limitation, methods to correct data from strain gauges.

Figure 1:
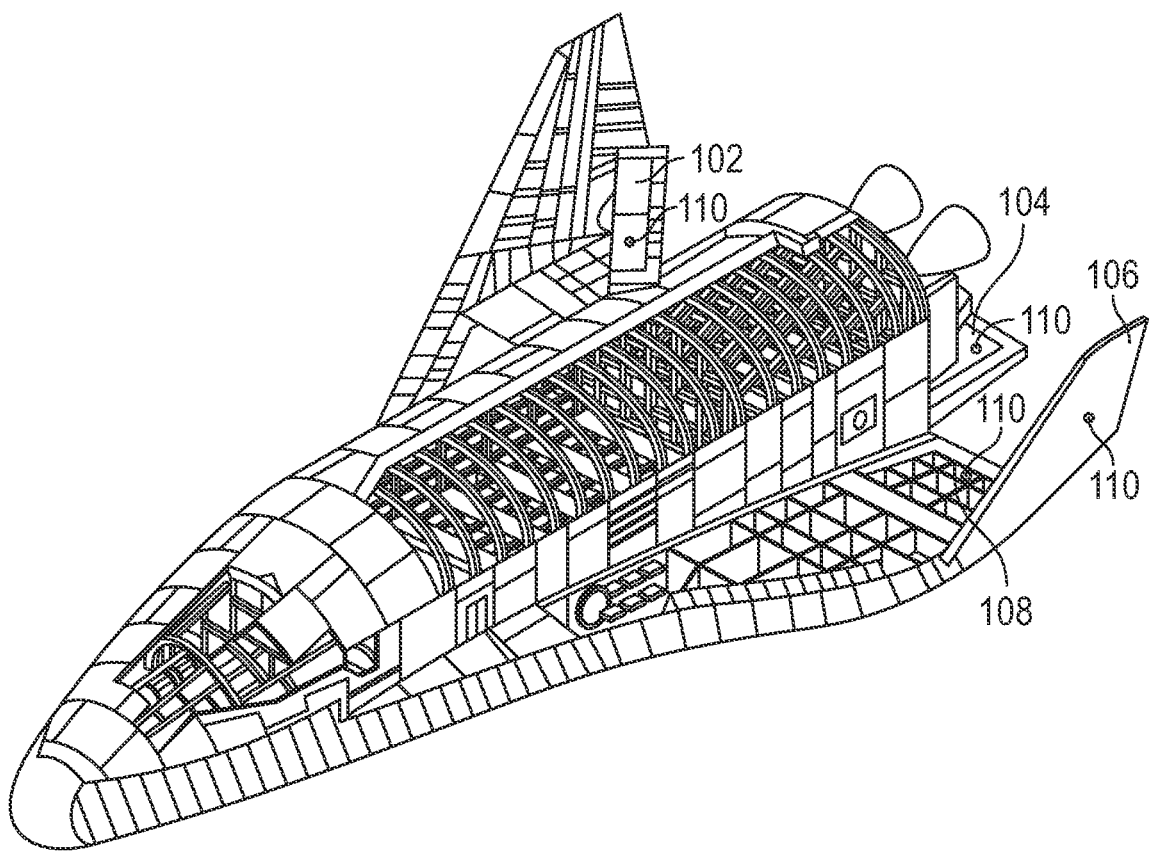
FIG. 1 is perspective view of an aircraft, according to some embodiments of the present disclosure.

FIG. 1 is perspective view of an aircraft 100, according to some embodiments of the present disclosure. As described herein, during the development and testing of an aircraft 100 designs of certain flight components and/or structures can be tested and/or validated. For example, varying loads, forces, flexure moments, and/or strain can be applied to certain panels or control surfaces, such as the speed brake 102, the body flap 104, the rudder 106, the elevon 108, and/or other similar aerodynamic control effectors during testing operations. The panels or control surfaces can be moved through various angles of attack during testing. Testing or validation of the aircraft 100 can be performed in wind tunnels and/or during test flights.

During testing, strain applied to the panels or control surfaces, such as the speed brake 102, the body flap 104, the rudder 106 and/or the elevon 108 can be monitored. As illustrated, one or more strain gauges 110 can be coupled or otherwise attached to the panels or control surfaces such as the speed brake 102, the body flap 104, the rudder 106 and/or the elevon 108 to determine the load, force, flexure moment, and/or strain on a respective panel or control surface.

In some applications, the aircraft 100 can be tested in hypersonic flight conditions or other conditions that expose the aircraft 100 to high temperatures. Accordingly, panels or control surfaces, such as the speed brake 102, the body flap 104, the rudder 106 and/or the elevon 108, and the strain gauges 110 can be exposed to high temperatures in excess of 200 degrees Fahrenheit, 500 degrees Fahrenheit, 540 degrees Fahrenheit (approximately 1000 Rankine) or more. As described herein, high temperatures, such as those experienced during hypersonic flight can cause voltage drift in the values provided by the strain gauges 110.

In the depicted example, the aircraft 100 can include one or more controllers configured to temperature correct the strain gauge values to provide accurate strain measurements across a wide range of temperatures, including high temperatures experienced during hypersonic flight. The controllers can be located on board the aircraft 100 or at a remote location to the aircraft 100. As described herein, the controllers can perform real-time or near real-time correction of strain gauge values to provide real-time or near real-time corrected strain values to a control system, an operator, a logging system, or a testing system, etc.

The controller or other portions of the aircraft 100 may include component(s) of a computer-based control system that stores computer program instructions, for example, within a non-transitory computer-readable storage medium such as a persistent magnetic storage drive, solid state drive, etc. The execution of those instructions, whether the execution in the controller or in another device may correct strain gauge values and result in control of the aircraft 100 or systems thereof.

Figure 2:
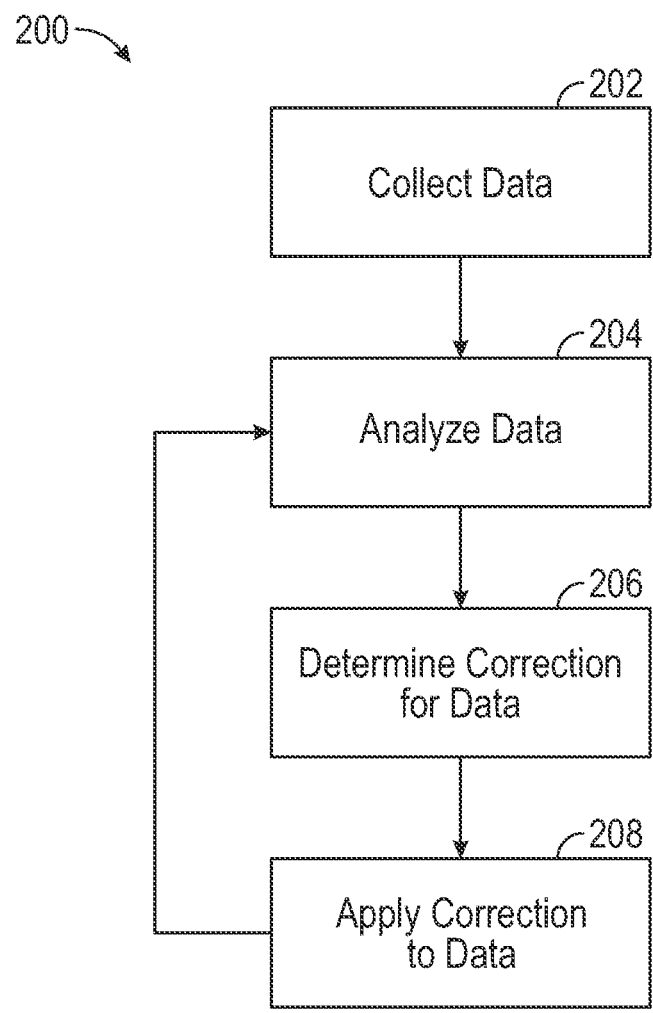
FIG. 2 is a flow chart illustrating a method for correcting data, according to some embodiments of the present disclosure.

FIG. 2 is a flow chart illustrating a method 200 for correcting data, according to some embodiments of the present disclosure. With reference to FIG. 2, method 200 can be utilized to temperature correct the strain gauge values from a strain gauge 110 to provide accurate strain measurements for panels or control surfaces across a wide range of temperatures, including high temperatures experienced during hypersonic flight.

In step 202, data is collected from one or more sensors of the aircraft. In the depicted example, data is collected from one or more strain gauges associated with one or more panels or control surfaces of interest. Further, temperature data is collected from a temperature sensor. In some embodiments, the temperature sensor is disposed adjacent to the strain gauge. Optionally, and as described herein, the angle of attack of the panel or control surface of interest can be collected.

In step 204, the collected data can be analyzed and/or consolidated. In some embodiments, strain data, temperature data, and/or angle of attack data can be time-aligned or otherwise consolidated. In some methods, relationships can be found between the data sets. As described herein, measured strain data can be compared with expected strain data for a given temperature or set of temperatures. In some embodiments, angle of attack data can be used to estimate or calculate expected strain data for a given temperature or a set of temperatures.

In step 206, a correction value can be determined for the measured data. In the depicted example, the difference between a measured strain value and an expected strain value can be used as a correction value for a given temperature. In some embodiments, the difference between various measured strain values and expected strain values is calculated to provide a plurality of correction values at various respective temperatures. As can be appreciated, correction values can be updated in real-time or near real-time as new data is collected.

In some applications, as described herein, a "best fit" or regression analysis can be performed to establish a curve or relationship between the correction values and the temperature. As can be appreciated, the relationship between the correction values and the temperature can be reevaluated in real-time or near real-time as new data is collected.

In step 208, measured data can be corrected to provide actual data for logging, analysis, and/or operation purposes.

In the depicted example, measured strain gauge data can be temperature corrected using either correction values or the correction relationship established in step 206. As can be appreciated, the temperature corrected strain gauge data can be utilized in real-time to determine load, force, flexure moment, or strain on the respective panel or control surface.

In some embodiments, the corrected data can be utilized to adjust the operation or testing procedure of the aircraft. For example, the corrected data can be used to adjust the angle of attack of a respective panel or control surface to adjust or alter a test procedure in response to the strain experienced by the panel or control surface.

In the depicted example, the corrected data can be reanalyzed to refine the corrections of the data and/or allow for self-learning operations.

Figure 3:
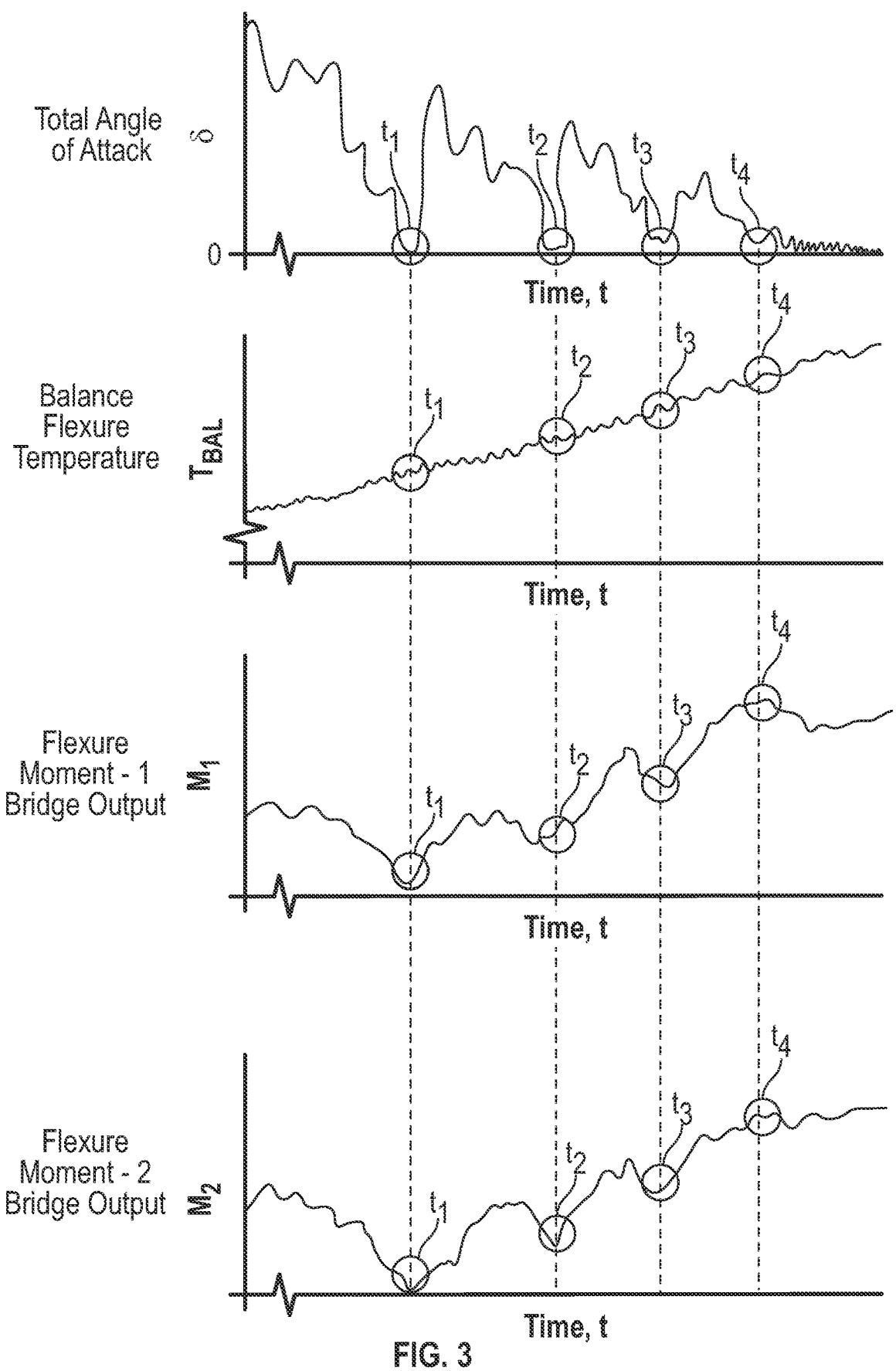
FIG. 3 illustrates a method of data analysis, according to some embodiments of the present disclosure.

FIG. 3 illustrates a method of data analysis, according to some embodiments of the present disclosure. In the depicted example, an analysis technique to temperature correct strain gauge values in real-time or near real-time by comparing expected strain gauge values to measured strain gauge values at various temperatures is shown.

During data collection, a series of measured strain gauge values are recorded from one or more strain gauges. As described herein, measured strain gauge values can be voltage values that may correspond to the amount of force, flexure moment, and/or strain that is applied to the strain gauge and/or the surface that the strain gauge is coupled to. In the depicted example, two sets of measured strain gauge values can be recorded. In some embodiments, different sets of measured strain gauge values can correspond to different strain directions and/or different surfaces.

Further, during the strain data collection, a series of temperature values can be recorded from one or more temperature gauges. The temperature values can be time aligned with the measured strain gauge values. As illustrated, each of the recorded temperature values can correspond to the temperature at the time of a respective measured strain gauge value to establish the temperature for each measured strain gauge value. In some embodiments, the temperature sensor can be configured to indicate the temperature at or near the respective strain gauge.

In some embodiments, operating parameters of the aircraft are collected simultaneously. Advantageously, data from operating parameters can be used to estimate, infer, or calculate expected strain values or forces that can be used for correction. The operating parameters can be time aligned with the measured strain gauge values and/or the temperature values. In the depicted example, the angle of attack of the surface of interest is recorded. As illustrated, each recorded angle of attack value can correspond to the angle of attack of the surface at the time of a respective measured strain gauge value to establish the angle of attack for the surface for each measured strain gauge value. In some applications, a higher angle of attack can be associated with a higher expected strain value on the surface, while a lower angle of attack can be associated with a lower expected strain value on the surface. In some embodiments, a zero or near-zero angle of attack can be associated with a zero or near-zero expected strain on the surface.

In the depicted example, the operating parameters of the aircraft can be analyzed to determine points of interest, such as $t_1$, $t_2$, $t_3$, $t_4$, etc. The points of interest can be points in time where an expected strain value can be estimated, inferred, or calculated based on the operating parameters. For example, the angle of attack of the surface can be analyzed to determine points of interest $t_1$, $t_2$, $t_3$, $t_4$, etc., where the expected strain values can be estimated, inferred, or calculated based on the angle of attack. In some embodiments, other parameters, such as air speed and/or atmospheric conditions can be utilized to determine expected strain values.

In some applications, the points of interest $t_1$, $t_2$, $t_3$, $t_4$, etc., can be points in time where the angle of attack of the surface is zero or near-zero. In some embodiments, a method to correct strain gauge values can estimate or infer that the expected strain on the surface is zero or near-zero at $t_1$, $t_2$, $t_3$, $t_4$, etc. As can be appreciated, the points of interest $t_1$, $t_2$, $t_3$, $t_4$, etc., can be points in time where the angle of attack of the surface is any other desired angle where the expected strain on the surface can be calculated or otherwise determined.

After the points of interest $t_1$, $t_2$, $t_3$, $t_4$, etc. based on the operating parameters are identified, the measured strain gauge values, and the respective temperatures at the points of interest $t_1$, $t_2$, $t_3$, $t_4$, etc. can be identified. Then, the measured strain gauge values can be compared to the expected strain gauge values at each respective temperature to determine the strain gauge correction value for each respective temperature. In some embodiments, the difference between the measured strain gauge value and the expected strain gauge value is the voltage drift due to the temperature of the strain gauge. In the illustrated example, the expected strain on the surface at the points of interest $t_1$, $t_2$, $t_3$, $t_4$, etc. can be zero or near-zero, providing that the measured strain gauge values at the points of interest are due to voltage drift or error due to the temperature of the strain gauge.

Figure 4:
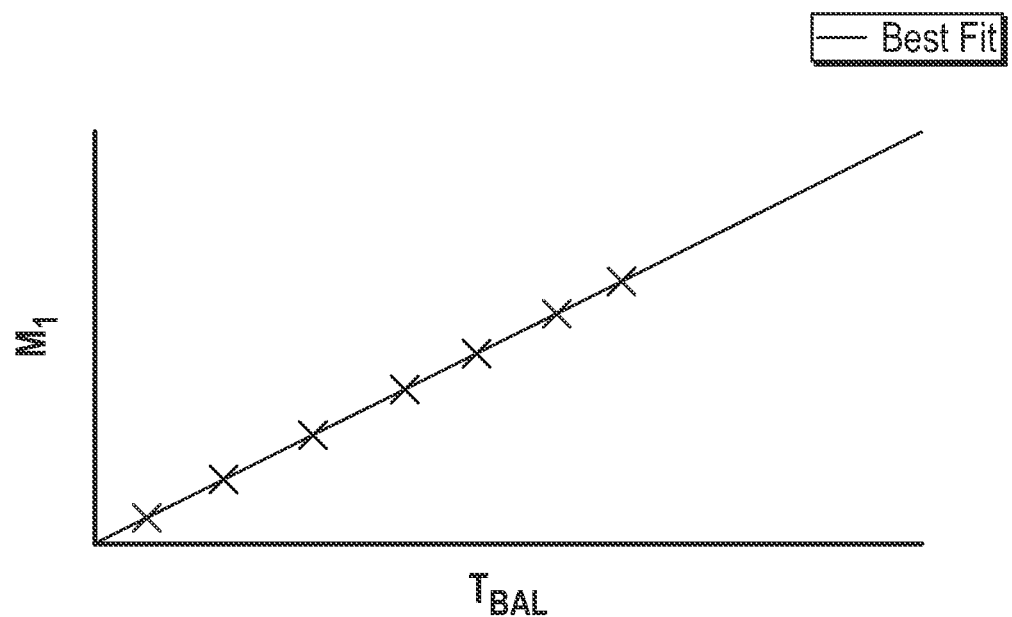
FIGS. 4 and 5 are charts that illustrate correction values against temperature values.
Figure 5:
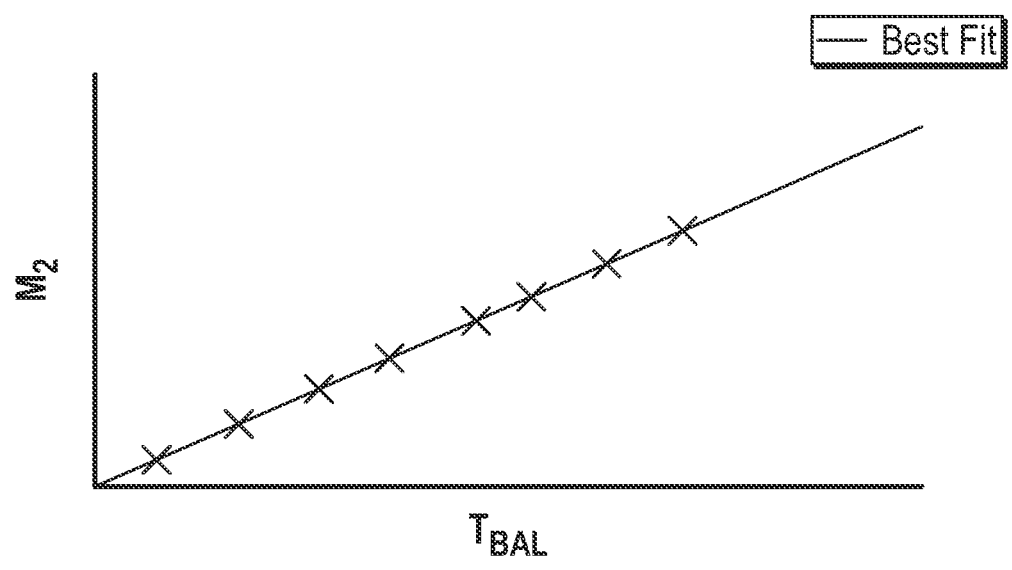

FIGS. 4 and 5 are charts that illustrate correction values against temperature values. With reference to FIGS. 4 and 5, the strain gauge correction values can be plotted or otherwise related to temperature values. As illustrated, a correlation or "best fit" between the strain gauge correction values and the temperature values can be calculated to determine a relationship between the correction values (residual voltage drift) and the temperature. The correction value—temperature relationship can be utilized to calculate the correction value for a strain gauge at a given temperature in real-time based on temperature. The corrected strain gauge values can be used for adjusting operation or testing procedures (e.g. adjust the angle of attack or other operating parameters), post flight/post test reconstruction, and/or self-learning/self-correcting models.

In some embodiments, the corrected values can be repeatedly analyzed to refine and/or improve the correction values and the correction value-temperature relationship. Optionally, the correlation or relationship between the correction value and the temperature values can be adjusted upon collecting additional information. For example, the correction value—temperature relationship can be updated or adjusted for varying temperature responses of the strain gauge and the surface (e.g. pops, creaks). Accordingly, the slope and/or curve of the correction value-temperature relationship can change.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method comprising:
   collecting a plurality of measured strain gauge values from a strain gauge;
   collecting a plurality of temperature values wherein each temperature value of the plurality of temperature values corresponds to a respective measured strain gauge value of the plurality of measured strain gauge values;
   identifying a plurality of measured strain gauge values of interest from the plurality of measured strain gauge values, wherein the plurality of measured strain gauge values of interest corresponds to a plurality of temperature values of interest;
   comparing the plurality of measured strain gauge values of interest to a plurality of expected strain gauge values of interest to determine a plurality of strain gauge correction values, wherein the plurality of strain gauge correction values corresponds to the plurality of temperature values of interest;
   correlating the plurality of strain gauge correction values to the plurality of temperature values of interest to determine a correction value-temperature relationship; and
   determining a corrected real-time strain gauge value by applying the correction value-temperature relationship to a real-time strain gauge value and a corresponding real-time temperature.

2. The method of claim 1, further comprising:
   collecting a plurality of angle of attack values wherein each angle of attack value of the plurality of angle of attack values corresponds to a respective measured strain gauge value of the plurality of measured strain gauge values.

3. The method of claim 2, further comprising:
   identifying a plurality of angle of attack values of interest from the plurality of angle of attack values; and identifying the plurality of measured strain gauge values of interest corresponding to the plurality of angle of attack values of interest.

4. The method of claim 3, wherein each of the plurality of expected strain gauge values of interest is about zero.

5. The method of claim 1, further comprising repeating comparing the plurality of measured strain gauge values of interest to the plurality of expected strain gauge values of interest to determine the plurality of strain gauge correction values after determining the correction value-temperature relationship.

6. The method of claim 1, wherein the plurality of measured strain gauge values comprises a plurality of voltage values.

7. The method of claim 1, further comprising:
time-aligning the plurality of measured strain gauge values with the plurality of temperature values.

8. An aircraft comprising:
a control surface;
a strain gauge coupled to the control surface;
a temperature sensor; and
a controller operatively coupled to the strain gauge and the temperature sensor, the controller configured to:
collect a plurality of measured strain gauge values from the strain gauge;
collect a plurality of temperature values from the temperature sensor, wherein each temperature value of the plurality of temperature values corresponds to a respective measured strain gauge value of the plurality of measured strain gauge values;
identify a plurality of measured strain gauge values of interest from the plurality of measured strain gauge values, wherein the plurality of measured strain gauge values of interest corresponds to a plurality of temperature values of interest;
compare the plurality of measured strain gauge values of interest to a plurality of expected control surface strain values of interest to determine a plurality of strain gauge correction values, wherein the plurality of strain gauge correction values corresponds to the plurality of temperature values of interest;
correlate the plurality of strain gauge correction values to the plurality of temperature values of interest to determine a correction value-temperature relationship; and
determine a strain value associated with the control surface by applying the correction value-temperature relationship to a real-time strain gauge value and a corresponding real-time temperature.

9. The aircraft of claim 8, wherein the control surface comprises a speed brake, a body flap, a rudder, or an elevon.

10. The aircraft of claim 8, wherein at least one temperature value of the plurality of temperature values is greater than 200 F.

11. The aircraft of claim 8, wherein the controller is further configured to:
collect a plurality of angle of attack values of the control surface wherein each angle of attack value of the plurality of angle of attack values corresponds to a respective measured strain gauge value of the plurality of measured strain gauge values.

12. The aircraft of claim 11, wherein the controller is further configured to:
identify a plurality of angle of attack values of interest from the plurality of angle of attack values; and
identify the plurality of measured strain gauge values of interest corresponding to the plurality of angle of attack values of interest.

13. The aircraft of claim 8, wherein each of the plurality of expected control surface strain values of interest is about zero.

14. The aircraft of claim 8, wherein the controller is further configured to repeatedly compare the plurality of measured strain gauge values of interest to the plurality of expected control surface strain values of interest to determine the plurality of strain gauge correction values after determining the correction value-temperature relationship.

15. The aircraft of claim 8, wherein the plurality of measured strain gauge values comprises a plurality of voltage values.

16. The aircraft of claim 8, wherein the controller is further configured to:
time-align the plurality of measured strain gauge values with the plurality of temperature values.

17. A non-transitory computer-readable storage medium storing one or more programs, the one or more programs comprising instructions which, when executed by a system, cause the system to:
collect a plurality of measured strain gauge values from a strain gauge;
collect a plurality of temperature values wherein each temperature value of the plurality of temperature values corresponds to a respective measured strain gauge value of the plurality of measured strain gauge values;
identify a plurality of measured strain gauge values of interest from the plurality of measured strain gauge values, wherein the plurality of measured strain gauge values of interest corresponds to a plurality of temperature values of interest;
compare the plurality of measured strain gauge values of interest to a plurality of expected strain gauge values of interest to determine a plurality of strain gauge correction values, wherein the plurality of strain gauge correction values corresponds to the plurality of temperature values of interest;
correlate the plurality of strain gauge correction values to the plurality of temperature values of interest to determine a correction value-temperature relationship; and
determine a corrected real-time strain gauge value by applying the correction value—temperature relationship to a real-time strain gauge value and a corresponding real-time temperature.

18. The non-transitory computer-readable storage medium of claim 17, further comprising:
collect a plurality of angle of attack values wherein each angle of attack value of the plurality of angle of attack values corresponds to a respective measured strain gauge value of the plurality of measured strain gauge values.

19. The non-transitory computer-readable storage medium of claim 18 further comprising:
identify a plurality of angle of attack values of interest from the plurality of angle of attack values; and
identify the plurality of measured strain gauge values of interest corresponding to the plurality of angle of attack values of interest.

20. The non-transitory computer-readable storage medium of claim 19, wherein each of the plurality of expected strain gauge values of interest is about zero.

* * * * *